Feb. 11, 1958 L. R. SCHMIDT 2,822,713
VALVE PACKING EXTRACTING TOOL
Filed Nov. 16, 1956

INVENTOR.
LEONARD R. SCHMIDT
BY
Donnelly, Mentag & Harrington
ATTORNEYS

2,822,713
VALVE PACKING EXTRACTING TOOL

Leonard R. Schmidt, Richmond, Mich.

Application November 16, 1956, Serial No. 622,648

1 Claim. (Cl. 81—8.1)

This invention relates to a valve packing extracting tool, and especially to a tool of this type which is adapted to remove the packing from the stuffing box around the stem of a valve.

The prior art devices for removing valve packing have all been made with either a hook or a cork screw on the end of an elongated rod. A disadvantage of such prior art tools is that there is always the danger of scoring or scratching the valve stem surface or the sides of the valve bonnet in which the packing is contained. Such scoring or scratch marks are injurious to the proper operation of the valve, since they provide sources of possible leakage of fluid along and through such marks. Accordingly, it is the primary object of this invention to provide a valve packing extracting tool which overcomes the aforementioned disadvantage of the similar prior art tools, in that the present tool is adapted to remove old worn, burned and deteriorated packing from the stuffing box of a valve without scoring or scratching the walls of the stuffing box or the valve stem.

It is another object of this invention to provide a valve packing extracting tool which includes a cylindrical body adapted to be slidably mounted over the stem of a valve, and which is provided with a pair of diametrically oppositely disposed cutters on one end thereof that are adapted to cut loose the packing around its periphery adjacent the stuffing box wall and also to shave or cut out the packing as the tool is rotated about the valve stem.

It is a further object of this invention to provide a valve packing extracting tool which is simple and compact in structure, economical of manufacture, and efficient in operation.

Other objects, features and advantages of this invention will be apparent from the following detailed description and appended claim, reference being had to the accompanying drawing forming a part of the specification wherein like reference numerals designate corresponding parts of the several views.

Figures 1, 2, 3:
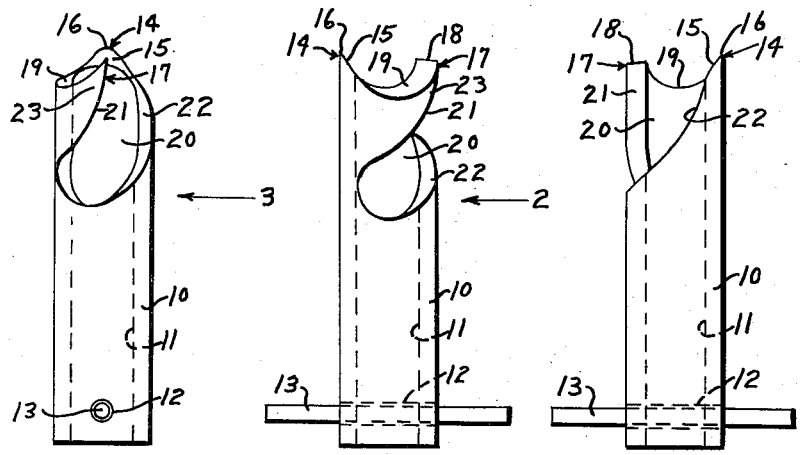
Fig. 1 is an elevational view of a tool embodying the principles of the invention.
Fig. 2 is a side elevational view of the structure shown in Fig. 1, taken in the direction of the arrow marked 2.
Fig. 3 is a side elevational view of the structure illustrated in Fig. 2, taken in the direction of the arrow marked 3.
Figure 4:
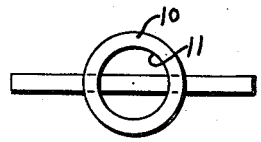
Fig. 4 is a bottom view of the structure illustrated in Fig. 1.

Referring now to the drawing, and in particular to Figs. 1 through 4 wherein is shown an illustrative embodiment of the invention, the numeral 10 designates the elongated cylindrical body of the tool through which is formed the centrally disposed longitudinal bore 11. One end of the body 10 is provided with a transverse hole therethrough, as designated by the numeral 12, which is adapted to slidably receive the bar handle 13 whereby the tool is provided with a T handle.

Formed on the upper end of the tool, as viewed in Figs. 1 through 4, is a spur or cutter generally designated by the numeral 14. The spur 14 is formed from the wall of the body 10 by grinding or facing off the inner part of said wall, as shown by the tapered portion 15. The ground off portion 15 terminates in the peripherally disposed cutting edge 16, which cutting edge is disposed in alignment with the outer circular plane of the body 10.

The body 10 is provided on the upper end thereof with another cutter, generally designated by the numeral 17, and which is disposed diametrically opposite to the spur or cutter 14. The cutter 17 is provided with a transverse or radially disposed cutting edge 18 which is preferably tapered slightly outwardly from the inner end thereof.

Figure 5:
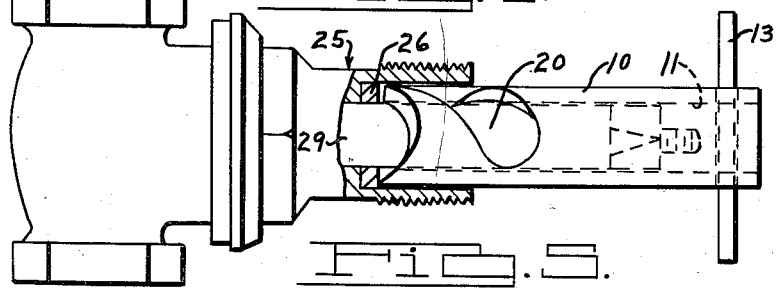
Fig. 5 is a view of a valve, partly in section, showing a tool of the present invention mounted in an operative position therein; and, Fig. 6 is a fragmentary sectional view of the type of valve on which the tool of the present invention may be used.
Figure 6:
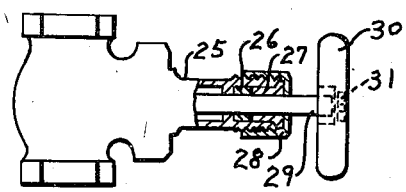

The wall of the body 10 is cut away at the upper end, as at 19, between the cutters 14 and 17 to form a recess or cavity. Formed on the other side of of the upper end of the body 10 and extending inwardly from the upper end thereof is the flute or spiral groove 20. The flute 20 extends longitudinally inwardly from the upper end of the body 10 and is bounded by the wall surfaces 21 and 22, and this groove extends around and under the cutter 17 to form the arm 23 which carries the cutter 17. The spiral groove 20 provides a means for passing the cuttings from the cutter 17 away from the surface of the packing which is being cut and prevents clogging of the cutters. As shown in the drawings, the spur or cutter 14 is extended outwardly longitudinally beyond the cutting edge of the cutter 17. The spur 14 preferably extends beyond the cutter 17 about one sixteenth of an inch. The tool of the present invention is adapted to remove old worn, burned and deteriorated packing from all makes and sizes of valves except valves having yoke type bonnets. A typical valve on which the instant tool is adapted to be used is illustrated in Figs. 5 and 6. The valve shown in Figs. 5 and 6 includes the usual bonnet 25 which is provided with a stuffing box adapted to hold the packing 26. The gland 27 abuts the outer surface of the packing and is held in engagement therewith by means of the packing nut 28. The valve stem 29 extends through the packing 26 and the gland and packing nut 27 and 28, respectively. The hand wheel 30 is detachably secured on the outer end of the stem 29 by the usual wheel nut 31.

In the use of the tool of the present invention, the wheel nut, hand wheel, packing nut and gland are removed in the usual manner. The body 10 of the tool is then slidably mounted on the stem 29 with the cutters 14 and 17 directed toward the packing 28. The handle 12 is then grasped and the tool is rotated in a counterclockwise direction, as viewed from the left side of Fig. 5. The spur or cutter 14 engages the packing around the periphery thereof and cuts it loose from the wall of the stuffing box. Continued rotation of the tool brings the cutter 17 into engagement with the outer surface of the packing and the packing is then cut or peeled out of the stuffing box. The cuttings will slide outwardly from the stuffing box through the spiral groove 20.

The valve packing extracting tool of the present invention may be made from any suitable tool steel or other suitable metal which has been hardened to a durable working degree. It will be understood that the size of the tool will depend upon the size of the valve being operated on. For example, the longitudinal bore 11 will be formed with a diameter slightly larger than the diameter of the valve stem on which the tool is to be rotatably mounted. Furthermore, the outer diameter of the body 10 will be made slightly less than the inner diameter of the stuffing box of the valve on which the tool is to be operated. The T handle 13 is releasably and slidably mounted in the hole 12 so that it may be easily removed therefrom, and be interchangeable and usable on various sizes of tools. The length of the tool body 10 will also depend on the length of the valve stem on which the tool is to be used.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claim.

What I claim is:

A valve packing extracting tool comprising: a cylindrical body provided with a centrally disposed longitudinal bore therethrough; a first cutter formed on one end of said body and having a radially disposed cutting edge; a second cutter formed on said one end of said body at a point diametrically opposite to said first cutter and having a peripherally disposed cutting edge extended outwardly longitudinally beyond said radially disposed cutting edge; said body being recessed on one side between said cutters and having a spiral groove formed in the other side between said cutters with said groove extending inwardly from said one end of the body and under said first cutter; and, a handle on the other end of said body.

References Cited in the file of this patent

UNITED STATES PATENTS

| | | |
|---|---|---|
| 931,718 | Bales | Aug. 24, 1909 |
| 1,195,220 | Hendren | Aug. 22, 1916 |
| 1,635,743 | Davenport | July 12, 1927 |